Figure 3:
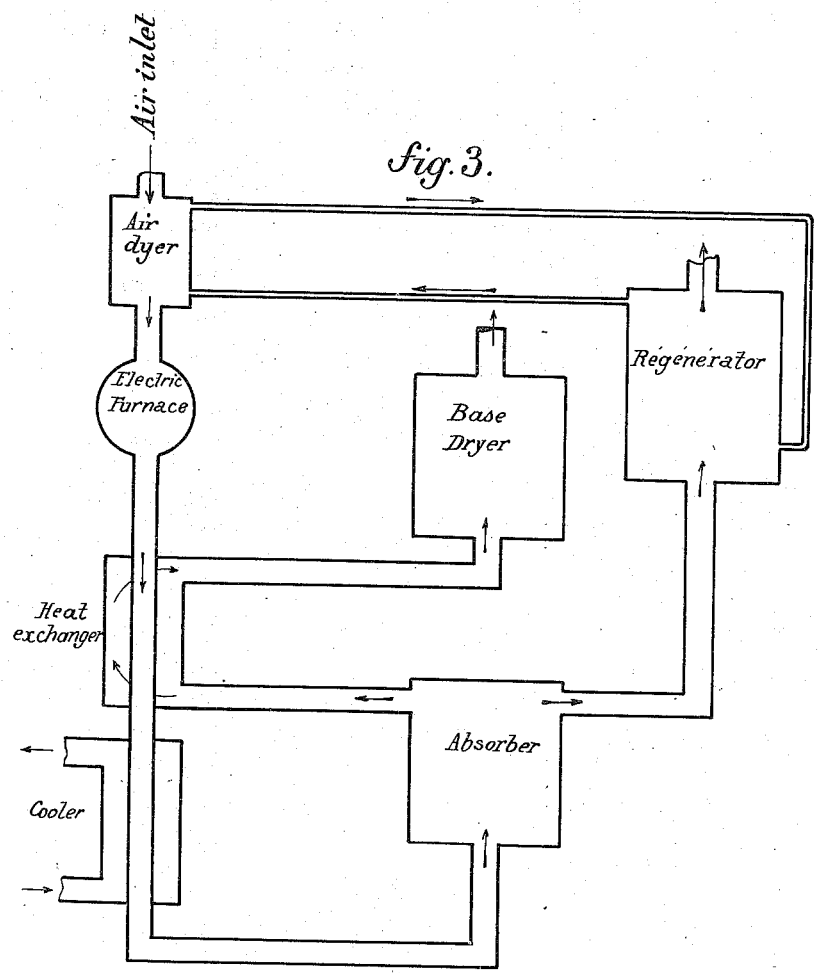

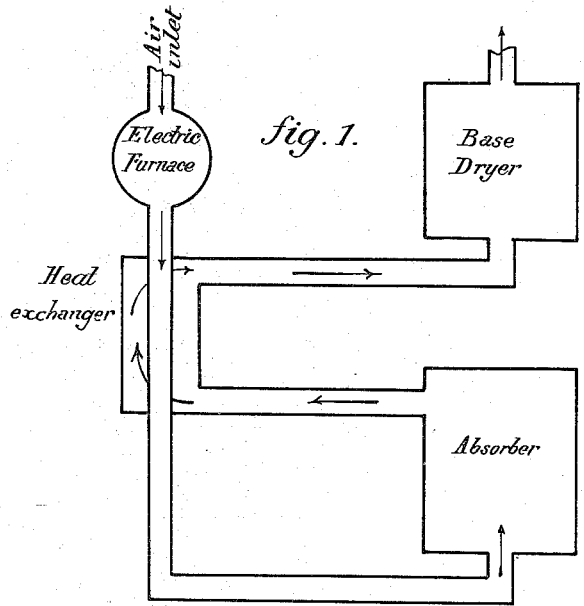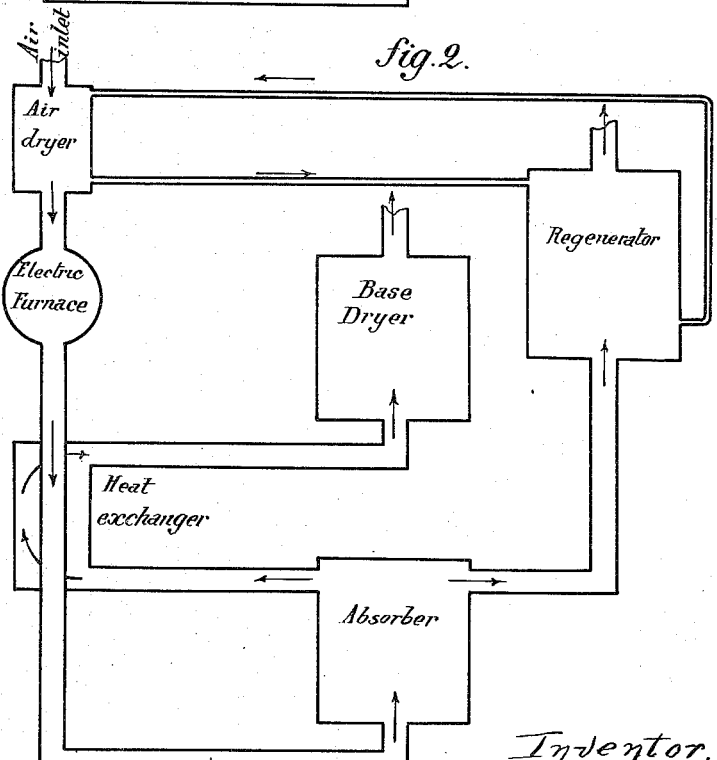

UNITED STATES PATENT OFFICE.

ALPHONSE THÉOPHILE SCHLOESING, OF PARIS, FRANCE, ASSIGNOR TO NORSK HYDRO-ELEKTRISK KVOELSTOFAKTIESELSKAB, OF CHRISTIANIA, NORWAY, A CORPORATION OF NORWAY.

PROCESS AND APPARATUS FOR ABSORBING NITROUS VAPORS IN THE DRY AND WITH HEAT BY THE AID OF A BASE SUCH AS LIME.

1,092,295.   Specification of Letters Patent.   Patented Apr. 7, 1914.

Application filed May 25, 1912.   Serial No. 699,795.

*To all whom it may concern:*

Be it known that I, ALPHONSE THÉOPHILE SCHLOESING, of 53 Quai d'Orsay, Paris, France, chemist, have invented a new and useful improvement in processes and apparatus for absorbing nitrous vapors in the dry and with heat by the aid of a base such as lime, which improvement is fully set forth in the following specification.

A method is known which consists in absorbing nitrous vapors contained in any gaseous mixture derived from an electric furnace or other source by passing gases into apparatus containing a base such as lime maintained at a suitable temperature.

This invention has for its object a process and apparatus by which the nitrous vapors are absorbed without any employment of external heat; the heat contained in the gases treated being completely utilized as far as practicable.

According to this invention the gaseous mixture passes into a series of apparatus, each of some known construction, in which it progressively parts with its heat, which is utilized for bringing the absorbent base to the desired degree of dehydration and to the temperature desired, for concentrating for example the sulfuric acid which serves to dry the air before its passage into the electric furnace or for other purposes.

The invention will be illustrated by a process in which nitrous vapors are produced in electric furnaces traversed by a current of air and in which quick lime in the form of an agglomerate for example is employed as the absorbent.

The sequence of operations in accordance with this invention will be as follows:—The air, before its entrance into the electric furnace, is dried in towers or other apparatus, where it comes into contact with a drying agent such as sulfuric acid. On issuing from the furnaces the gases containing among others nitrous vapors, pass through a heat interchanger of known type, in which by the continuous interchange of heat through conducting walls or again by intermittent recuperation they raise a portion of the gases deprived of nitrous vapors issuing from the absorber to a sufficient temperature as will be subsequently seen. These gases deprived of nitrous vapors and brought in the heat interchanger to a suitable temperature, are delivered into suitable apparatus where they serve to dry and dehydrate the wet agglomerates of slaked lime produced in the process to form quick lime which acts as an absorber of nitrous vapors. The gases containing the nitrous vapors then pass through a cooler which lowers their temperature to about 300° to 400° C. which is a temperature suitable for their entry into the absorbers. These latter apparatus contain the agglomerates of quick lime previously mentioned, and it is in these apparatus that the methodical absorption of the nitrous vapors contained in the gaseous mixture takes place at temperatures varying preferably between 300° and 400° C. The heat generated by the reactions of absorption contributes to maintain the required temperature in these apparatus which may be surrounded with good non-conducting material. The gases remain in the absorbers the time necessary for them to be entirely freed from their nitrous vapors. Gases issuing from the absorbers may be divided into two portions, one passing to the heat interchanger as previously described, the other portion being directed to a tower or other apparatus where they serve to concentrate and bring the sulfuric acid which has been diluted by the process of drying the air before its introduction into the furnaces to its initial degree of concentration. The gases deprived of as much nitrous vapors as desired are rejected or utilized for any suitable purpose. All the operations are thus carried out alone with the heat contained in the gases from the electric furnaces without the aid of external heat, calcium nitrate practically free from nitrite and having a high percentage of nitrogen being obtained.

The accompanying illustrative drawings show three arrangements of apparatus which form installations in accordance with this invention.

Figure 1 shows the most simple case and comprises an electric furnace into which undried air passes directly. At the outlet from the electric furnace is a heat interchanger through which the gaseous mixture issuing from the furnace and containing nitrous vapors passes. At the outlet from the heat interchanger is arranged an absorber which contains the absorbent base. The absorber is so connected with the heat interchanger that the gaseous mixture deprived of its nitrous vapors passes through the said heat interchanger and is heated by the gaseous mixture issuing from the furnace; the heat interchanger is also connected with the apparatus for drying and dehydrating the absorbent base and the gaseous mixture deprived of nitrous vapors and heated by its passage in the heat interchanger passes into the said drying and dehydrating apparatus where it dries and dehydrates the absorbent base so as to render it fit to be placed in the absorber to absorb nitrous vapors; the gaseous mixture then passes into the atmosphere.

Fig. 2 corresponds to the case in which air is dried before entering the furnace. This apparatus comprises besides the elements shown in Fig. 1 an air drier containing for example sulfuric acid and a regenerator for regenerating the drying agent, for example a sulfuric acid concentrator connected to the air drier for the circulation of the acid by suitable intermittent or continuous means. The absorber is connected to the regenerator in such a manner that a portion of the gaseous mixture deprived of nitrous vapors by its passage into the absorber passes to the regenerator. It may be remarked that this portion of the denitrified gaseous mixture which passes to the regenerator may also pass through a heat interchanger, heat being derived from the gaseous mixture issuing from the furnace.

Fig. 3 corresponds to the apparatus shown in Fig. 2 but combined with a cooler in order to lessen the temperature of the gaseous mixture issuing from the temperature interchanger before passing to the absorber.

Claims:

1. A process for absorbing nitrous vapors from a gaseous mixture in the dry and with heat by the aid of a base such as lime which consists in first passing the gases into a heat interchanger, where it heats a portion of the gases issuing from the absorber, and then into the absorber; a portion of the gaseous mixture deprived of its nitrous vapors passing again into the said heat interchanger for reheating such portion, then passing through the apparatus for drying and dehydrating the absorbent base; the other portion of the gaseous mixture passing out of the absorbing apparatus and deprived of its nitrous vapors passing through the apparatus for regenerating the drying agent which serves to dry the air treated in the installation.

2. A process of absorbing nitrous vapors produced in a vapor generator which consists in introducing said vapors into an absorption base at a temperature varying between 300° and 400°, centigrade, substantially, then heating the gases which leave the absorption base by the heated vapors from the vapor generator and then leading said gases into contact with hydrated base to dehydrate the same.

3. A process of absorbing nitrous vapors produced in a vapor generator which consists in introducing said vapors into an absorption base at a temperature of from 300° to 400° centigrade, substantially, then heating a portion of the gases which leave the absorption base by the heated vapors from the vapor generator, and leading them into contact with hydrated base to dehydrate the same, and leading the remainder of such gases through a drying agent for carrying off moisture from and regenerating the same.

4. In apparatus for absorbing nitrous vapors in the dry and with heat by the aid of a base such as lime the combination with an electric furnace for forming nitrous compounds with the elements of the atmospheric air, of an apparatus in which the nitrous vapors in the gaseous mixture issuing from the furnace are absorbed by a base, a heat interchanger through which pass the gases issuing from the furnace and a portion of the gaseous mixture deprived of nitrous vapors issuing from the absorber and in which this portion is reheated, and an apparatus for previously drying and dehydrating the absorbent base by means of a portion of the gaseous mixture issuing from the absorber and reheated by the gaseous mixture issuing from the furnace.

5. In apparatus for absorbing nitrous vapors in the dry and with heat by the aid of a base such as lime the combination with an apparatus for drying air, of an electric furnace for forming nitrous compounds with the elements of air dried by the said drying apparatus, an apparatus in which the nitrous vapors in the gaseous mixture issuing from the furnace are absorbed by a base, a heat interchanger through which pass the gases issuing from the furnace and a portion of the gaseous mixture deprived of nitrous vapors issuing from the absorber and in which this portion is reheated, an apparatus for previously drying and dehydrating the absorbent base by means of a portion of the gaseous mixture issuing from the absorber and reheated by the gaseous mixture issuing from the furnace, and an apparatus for regenerating the air drying agent in which the agent is regenerated by the heat derived from the other portion of the gaseous mixture issuing from the absorber.

6. In apparatus for absorbing nitrous vapors in the dry and with heat by the aid of a base such as lime the combination with an electric furnace for forming nitrous compounds with the elements of the atmospheric air, of an apparatus in which the nitrous vapors in the gaseous mixture issuing from the furnace are absorbed by a base, a heat interchanger through which pass the gases issuing from the furnace and a portion of the gaseous mixture deprived of nitrous vapors issuing from the absorber and in which this portion is reheated, of a cooler in which the gaseous mixture issuing from the heat interchanger loses a portion of its heat, an apparatus for previously drying and dehydrating the absorbent base by means of a portion of the gaseous mixture issuing from the absorber and reheated by the gaseous mixture issuing from the furnace and an apparatus for regenerating the air drying agent in which the agent is regenerated by the heat derived from the other portion of the gaseous mixture issuing from the absorber.

In testimony whereof I have signed this specification in the presence of two subscribing witnesses.

ALPHONSE THÉOPHILE SCHLOESING.

Witnesses:
LUCIEN MEMMINGER,
FREDERI HARLE.